US008335927B2

(12) United States Patent
Niinuma

(10) Patent No.: US 8,335,927 B2
(45) Date of Patent: Dec. 18, 2012

(54) AUTHENTICATION METHOD AND APPARATUS

(75) Inventor: Koichiro Niinuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 660 days.

(21) Appl. No.: 12/474,405

(22) Filed: May 29, 2009

(65) Prior Publication Data
US 2010/0042850 A1 Feb. 18, 2010

(30) Foreign Application Priority Data

Aug. 12, 2008 (JP) ................................. 2008-208206

(51) Int. Cl.
G06F 21/00 (2006.01)
G06F 9/00 (2006.01)
G06F 7/04 (2006.01)
(52) U.S. Cl. ................. 713/186; 713/2; 713/182; 726/2
(58) Field of Classification Search .................. 726/2–8, 726/16–21, 26–30; 713/2, 164–167, 182, 713/185–186
See application file for complete search history.

(56) References Cited

U.S. PATENT DOCUMENTS

| 4,719,566 | A | * | 1/1988 | Kelley ........................ 340/5.27 |
| 5,180,901 | A | | 1/1993 | Hiramatsu |
| 5,457,747 | A | * | 10/1995 | Drexler et al. ................ 713/186 |
| 6,308,275 | B1 | * | 10/2001 | Vaswani et al. .................... 726/2 |
| 6,615,191 | B1 | | 9/2003 | Seeley |
| 7,302,698 | B1 | * | 11/2007 | Proudler et al. ................... 726/2 |
| 2002/0095588 | A1 | * | 7/2002 | Shigematsu et al. .......... 713/186 |
| 2002/0157021 | A1 | * | 10/2002 | Sorkin et al. .................. 713/201 |
| 2003/0105725 | A1 | * | 6/2003 | Hoffman .......................... 705/75 |
| 2003/0154406 | A1 | * | 8/2003 | Honarvar et al. .............. 713/201 |
| 2004/0088588 | A1 | * | 5/2004 | Awada et al. ................. 713/202 |
| 2004/0129787 | A1 | * | 7/2004 | Saito et al. ..................... 235/492 |
| 2004/0172545 | A1 | * | 9/2004 | Ogata ............................ 713/189 |
| 2005/0076237 | A1 | * | 4/2005 | Cohen et al. .................. 713/201 |
| 2006/0080537 | A1 | * | 4/2006 | Yoshizaki ..................... 713/176 |
| 2006/0101508 | A1 | * | 5/2006 | Taylor ............................... 726/7 |

(Continued)

FOREIGN PATENT DOCUMENTS

JP 2005-143804 6/2005

(Continued)

OTHER PUBLICATIONS

European Search Report dated Nov. 24, 2009, from the corresponding European Application.

Primary Examiner — Darren B Schwartz
(74) Attorney, Agent, or Firm — Katten Muchin Rosenman LLP

(57) ABSTRACT

An authentication method for use in an apparatus having a function, a function to execute a first program that executes a predetermined process after first user authentication with biometrics authentication is performed and does not have a network connection function, and a function to execute a second program that is invoked after the first program is executed, executed after second user authentication and has a network connection function comprises executing the first program in forgery detection mode regardless of a result of a user determination if biometrics authentication with forgery is detected at the time of the first user authentication, invoking the second program in the forgery detection mode after the first program is executed in the forgery detection mode, and notifying a device connected to an external network of forgery detection information by using the network connection function after the second program is invoked in the forgery detection mode.

22 Claims, 11 Drawing Sheets

U.S. PATENT DOCUMENTS

| | | | |
|---|---|---|---|
| 2006/0161786 A1* | 7/2006 | Rao | 713/183 |
| 2006/0262480 A1* | 11/2006 | Stewart | 361/251 |
| 2007/0255946 A1 | 11/2007 | Kokubun | |
| 2008/0082828 A1* | 4/2008 | Jennings et al. | 713/176 |
| 2008/0133931 A1* | 6/2008 | Kosaka | 713/186 |
| 2008/0276306 A1* | 11/2008 | Fifer et al. | 726/5 |
| 2009/0002126 A1* | 1/2009 | Okazaki | 340/5.53 |
| 2009/0070593 A1* | 3/2009 | Boshra et al. | 713/186 |
| 2011/0066839 A1* | 3/2011 | Wang et al. | 713/2 |

FOREIGN PATENT DOCUMENTS

| | | |
|---|---|---|
| JP | 2007-299236 | 11/2007 |
| WO | 01/27723 | 4/2001 |

* cited by examiner

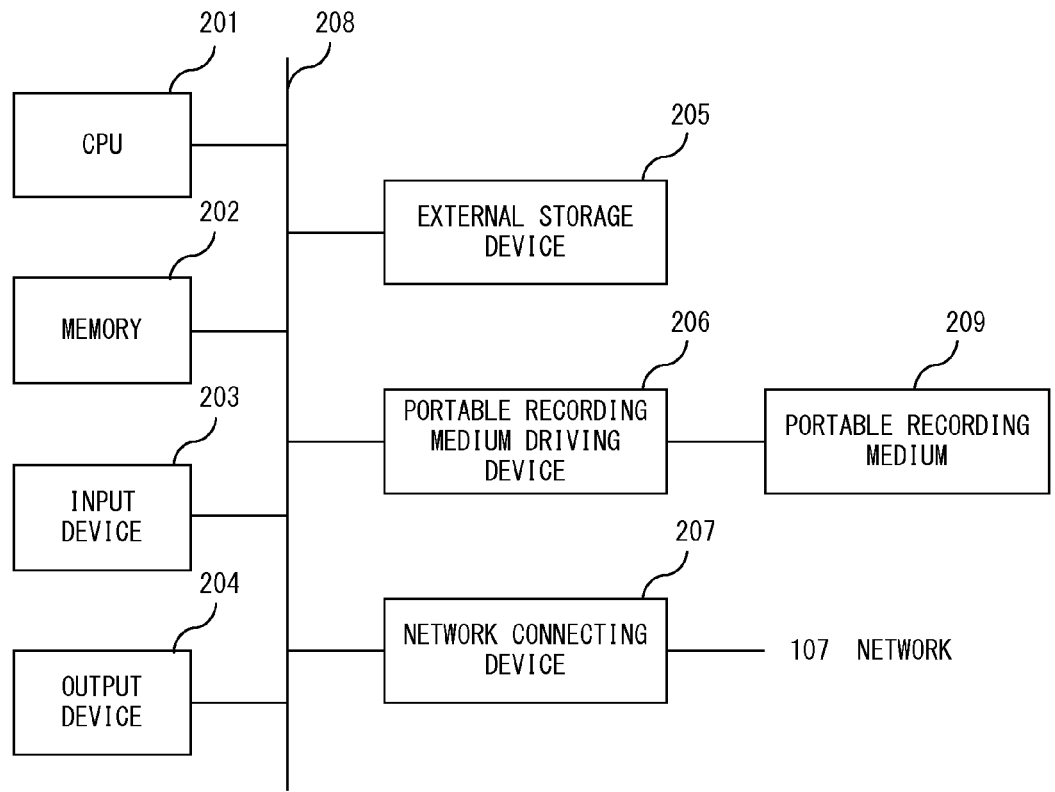
F I G. 2

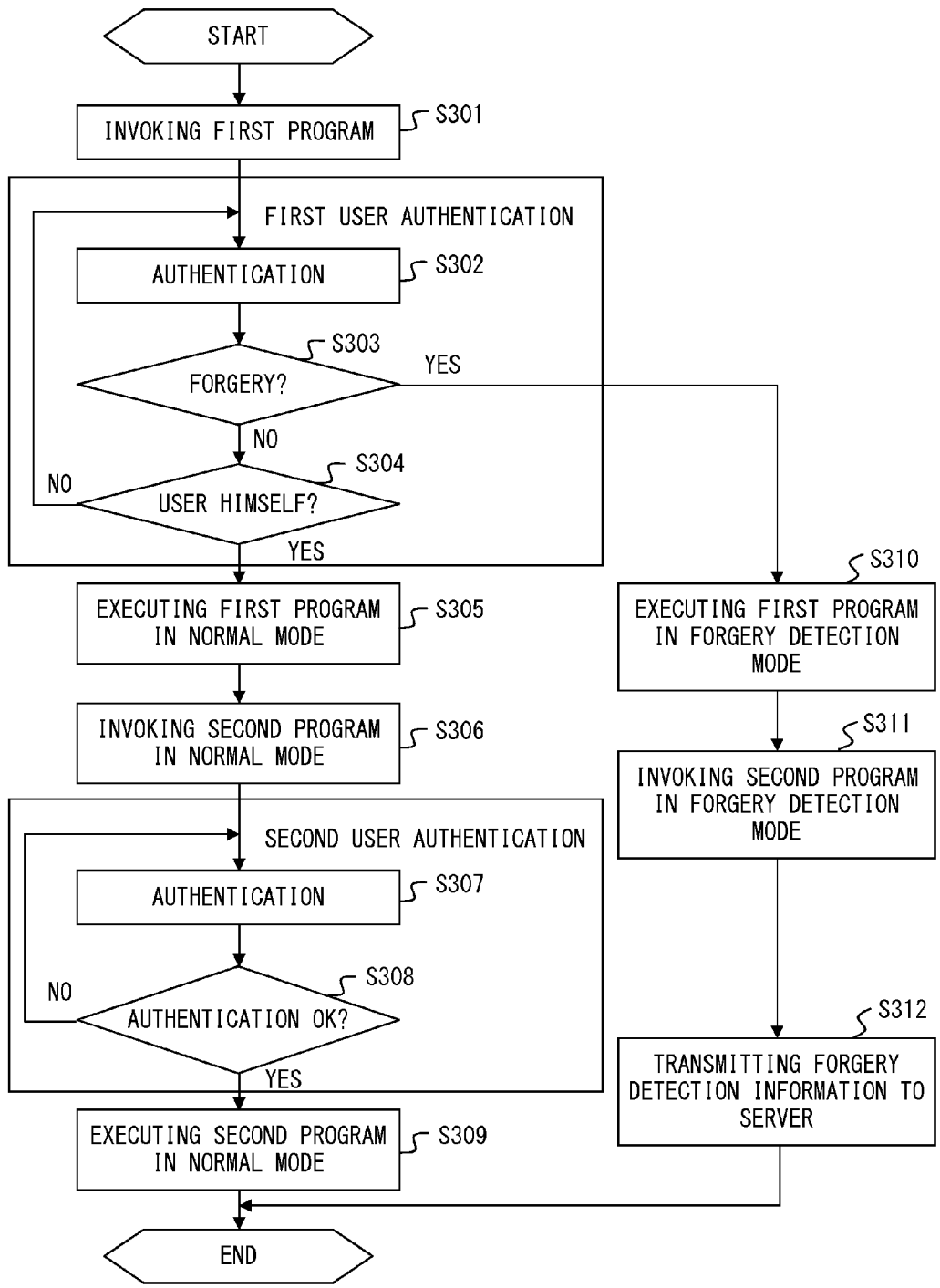
F I G. 3

F I G. 5

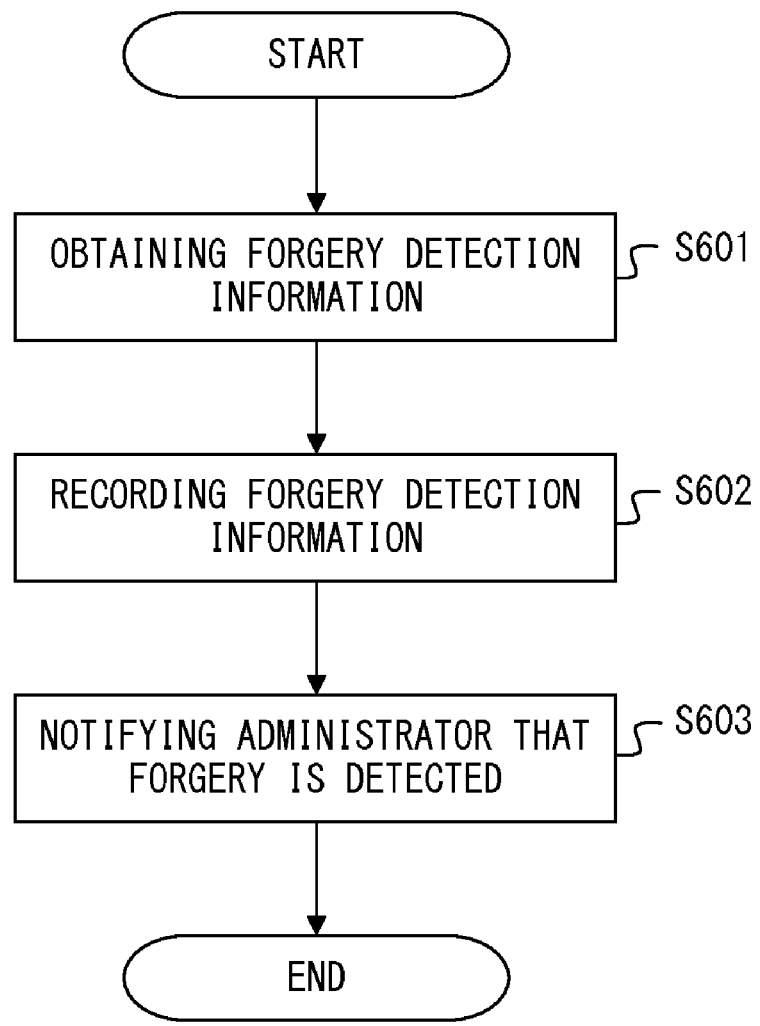
F I G. 6

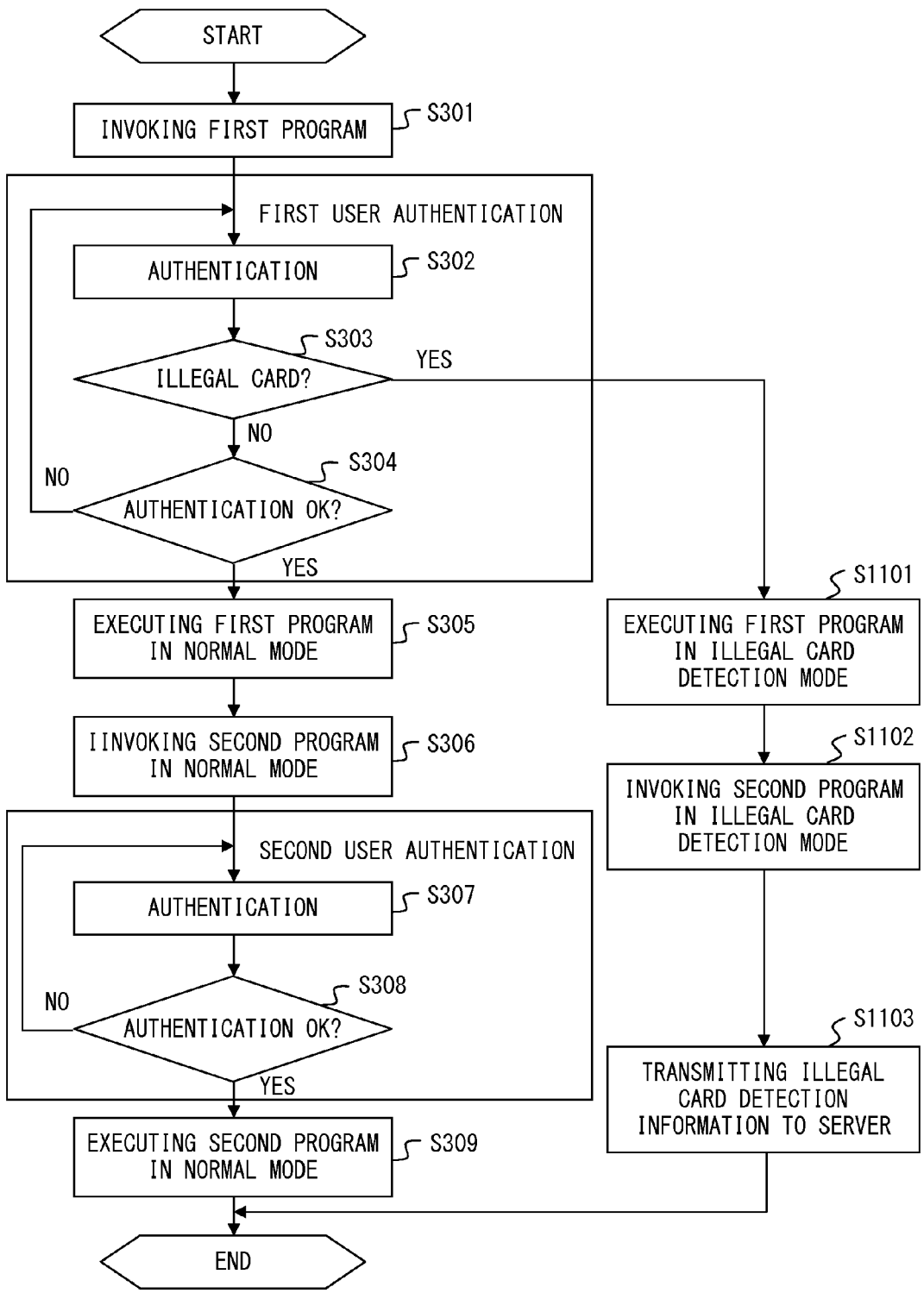
F I G. 11

AUTHENTICATION METHOD AND APPARATUS

CROSS-REFERENCE TO RELATED APPLICATION

This application is based upon and claims the benefit of priority of the prior Japanese Patent Application No. 2008-208206, filed on Aug. 12, 2008, the entire contents of which are incorporated herein by reference.

FIELD

The present invention relates to an authentication technique.

BACKGROUND

Since widely used conventional password authentication and ID card authentication as personal authentication have a high risk of theft, biometrics authentication such as fingerprint authentication, etc. has been drawing attention as personal authentication with higher reliability, and has been used in diverse scenes in recent years.

Authentication with forgery is pointed out as a problem of biometrics authentication, and many techniques have been already proposed. For example, the following Patent Document 1 discloses the technique as a technique for eliminating an illegal use made by a forged fingerprint.

If authentication by a forged finger is detected in biometrics authentication, this means that a definitely malicious user attempts the authentication unlike the case where the user is determined as a different person. This requires immediate measures to be taken. For example, if authentication is performed in a program connectable to a network, such as authentication on an OS (Operating System), a result of an authentication with forgery can be quickly notified to a server or an administrator. However, for authentication in a program unconnectable to a network, such as authentication in a BIOS environment, the result cannot be notified to a server or an administrator. Therefore, an illegal user can repeatedly attempt illegal authentication with forgery without being notified to an administrator.

The technique disclosed by the following Patent Document 2 proposes the method by which a log in BIOS authentication is recorded to a BIOS-ROM, etc., and the log is notified to a server when a program connectable to a network, such as an OS, etc. is invoked thereafter.

[Patent Document 1] Japanese Laid-open Patent Publication No. 2005-143804

[Patent Document 2] Japanese Laid-open Patent Publication No. 2007-299236

SUMMARY

However, the conventional technique disclosed by Patent Document 1 is not the technique that does not take authentication in an OS or BIOS environment into account. Therefore, this technique has a problem of being unable to suitably cope with an illegal authentication action.

Additionally, the conventional technique disclosed by Patent Document 2 has a problem that an illegal user using forgery cannot be detected immediately or a log can be possibly falsified before the next authentication is successfully performed because the log cannot be notified until the next authentication is successfully performed (after OS is invoked).

Namely, the conventional techniques have the problem that an illegal user using forgery cannot be immediately detected since the first program is executed only after user authentication is successfully performed in an authentication apparatus executing the first program (such as BIOS) that executes a predetermined process after first user authentication with biometrics authentication is performed and does not have a network connection function, and the second program (such as an OS) that is invoked after the first program is executed, executed after second user authentication and has a network connection function.

A first aspect of the authentication method, apparatus or program according to the present invention assumes an authentication method, apparatus or program for use in an apparatus having a function to detect biometrics authentication with forgery, a function to execute a first program, which executes a predetermined process and does not have a network connection function, after first user authentication with biometrics authentication is performed, and a function to execute a second program that is invoked after the first program is executed, executed after second user authentication and has a network connection function.

A second aspect of the authentication method, apparatus or program according to the present invention assumes an authentication method, apparatus or program for use in an apparatus having a function to detect biometrics authentication with forgery, a function to execute a first program, which executes a predetermined process and does not have a network connection function, after first user authentication with biometrics authentication is performed, and a function to execute a second program that is invoked after the first program is executed, executed after second user authentication and has a network connection function.

A third aspect of the authentication method, apparatus or program according to the present invention assumes an authentication method, apparatus or program for use in an apparatus having a function to detect biometrics authentication with forgery, a function to execute a first program, which executes a predetermined process and does not have a network connection function, after first user authentication with biometrics authentication is performed, and a function to execute a second program that is invoked after the first program is executed and has a network connection function.

A fourth aspect of the authentication method, apparatus or program according to the present invention assumes an authentication method, apparatus or program for use in an apparatus having a function to detect card authentication with an illegal card, a function to execute a first program, which executes a predetermined process and does not have a network connection function, after first user authentication with card authentication is performed, and a function to execute a second program that is invoked after the first program is executed, executed after second user authentication and has a network connection function.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is an example hardware configuration of a computer including the system illustrated in FIG. 1;

FIG. 3 is an operational flowchart illustrating a control process in the first embodiment of a biometrics authentication process in the system configuration illustrated in FIGS. 1 and 2;

FIG. 5 is an example data structure of forgery detection information notified from a client 101 to a server 108;

FIG. 6 is an operational flowchart illustrating an example control process executed by the server 108 that is illustrated in FIG. 1 and receives the forgery detection information;

FIG. 11 is an operational flowchart illustrating a control process in the sixth embodiment of the biometrics authentication process in the system configuration illustrated in FIGS. 1 and 2.

DESCRIPTION OF EMBODIMENTS

Embodiments according to the present invention are described in detail below with reference to the drawings.

System Configuration Common to Embodiments

Figure 1:
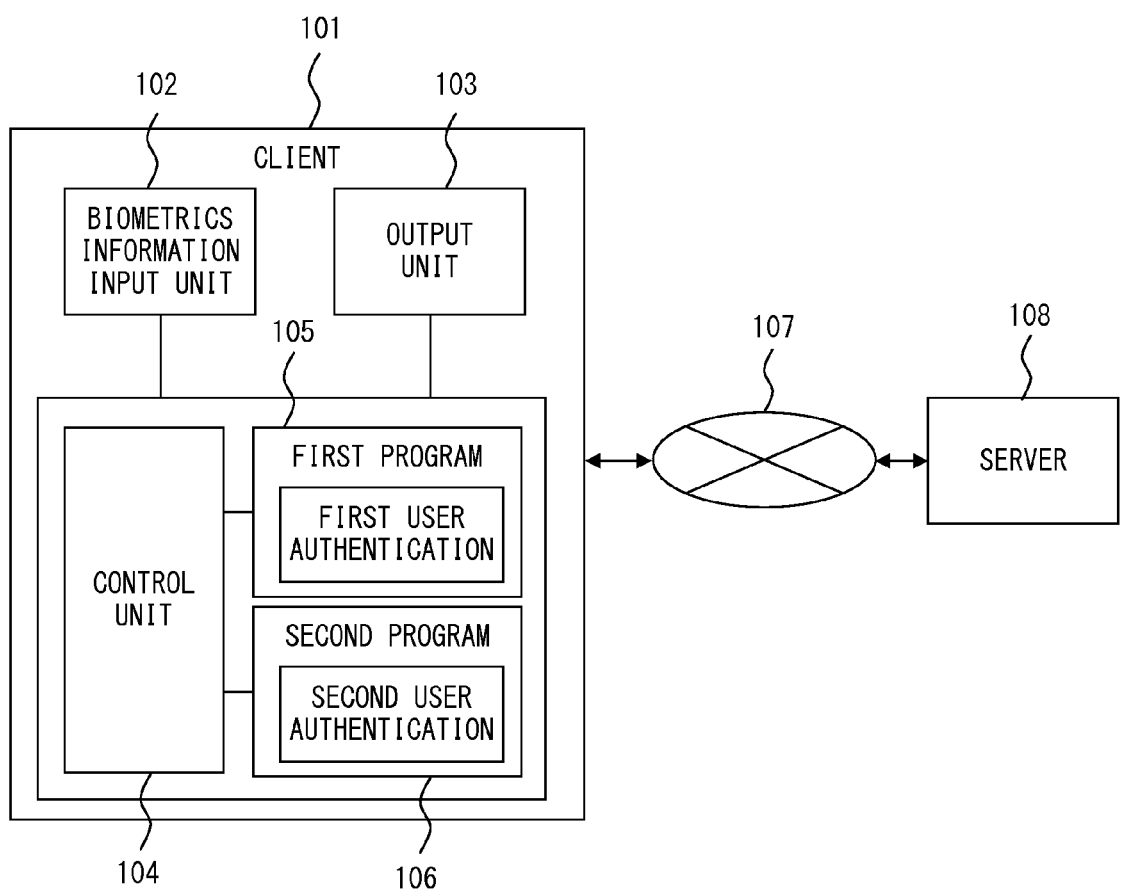
FIG. 1 is a system configuration common to first to sixth embodiments.

FIG. 1 is a system configuration common to first to sixth embodiments.

A client 101 is, for example, a personal computer system used by a user.

A biometrics information input unit 102 inputs fingerprint information by causing a user to put his or her finger for fingerprint authentication.

An output unit 103 displays an authentication screen for a user, and displays various types of applications after startup.

A control unit 104 controls an authentication process of biometrics information, and invokes a first program 105 and a second program 106 when necessary. The first program 105 is, for example, BIOS (Basic Input Output System), and the second program 106 is, for example, an operating system.

A server 108 receives and processes forgery detection information from the client 101.

A network 107 is, for example, the Internet connecting the client 101 and the server 108.

FIG. 2 is an example hardware configuration of a computer including the above described system.

The computer illustrated in FIG. 2 includes a CPU 201, a memory 202, an input device 203, an output device 204, an external storage device 205, a portable recording medium driving device 206 in which a portable recording medium 209 is inserted, and a network connecting device 207. These constituent elements are interconnected by a bus 208. The configuration illustrated in FIG. 2 is one example of a computer that can implement the above described system, and such a computer is not limited to this configuration.

The CPU 201 controls the entire computer. The memory 202 is a memory, such as a RAM, etc., for temporarily storing a program or data stored on the external storage device 205 (or the portable recording medium 209) when the program is executed or the data is updated, etc. The CPU 201 controls the entire computer by loading the program into the memory 202 and executing the program.

The input device 203 is composed of, for example, a keyboard, a mouse, the biometrics information input unit 102 illustrated in FIG. 1, and their interface control devices. The input device 203 detects an input operation that a user performs with the keyboard, the mouse, etc., and an input of biometrics information, and notifies the CPU 201 of detection results.

The output device 204 is composed of a display device, a printing device, etc., and their interface control devices. The output device 204 outputs data transmitted according to the control of the CPU 201 to the display device or the printing device.

The external storage device 205 is, for example, a hard disk storage device. The external storage device 205 is mainly used to store various types of data and programs.

The portable recording medium driving device 206 is a device in which the portable recording medium 209 such as an optical disk, an SDRAM, a compact flash, etc. is set, and assists the external storage device 205.

The network connecting device 207 is a device for connecting to the network 107 illustrated in FIG. 1, for example, via a communication line of a LAN (Local Area Network) or a WAN (Wide Area Network).

The system illustrated in FIG. 2 is realized in a way such that the CPU 201 executes a program for implementing the functions of the control unit 101, the first program 105 and the second program 106, which are illustrated in FIG. 1. The program may be recorded, for example, on the external storage device 205 or the portable recording medium 209 and distributed. Alternatively, the program may be obtained from the network 107 by using the network connecting device 207.

FIG. 3 is an operational flowchart illustrating a control process in the first embodiment of a biometrics authentication process in the system configuration illustrated in FIGS. 1 and 2. This process is implemented as a function of the control unit 101 illustrated in FIG. 1. This process is hereinafter described with reference to FIGS. 1 and 3 when necessary.

Initially, the control unit 101 invokes the first program 105 (step S301).

Next, the control unit 101 executes a first user authentication process in steps S302 to S303.

Namely, fingerprint information is input from the biometrics information input unit 102 to the control unit 101, which then makes biometrics authentication for the fingerprint information (step S302). As the biometrics authentication, a determination using impedance, etc. is made, for example, in addition to the image recognition of a fingerprint.

The control unit 101 determines whether or not the fingerprint is a forged one based on a result of the biometrics authentication process of step S302 (step S303).

If the control unit 101 determines that the fingerprint is not the forged one, it further determines whether or not the fingerprint is that of the user, which is preregistered to the system (steps S303 to S304).

If the control unit 101 determines that the fingerprint is not that of the user, it repeats the biometrics authentication process (steps S304 to S302).

If the control unit 101 determines that the fingerprint is that of the user, it executes the first program 105 in normal mode.

Furthermore, the control unit 101 invokes the second program 106 in the normal mode upon completion of invoking the first program 105.

Thereafter, the control unit 101 executes a second user authentication process under the control of the second program 106 in steps S307 and S308.

Namely, the fingerprint information is input from the biometrics information input unit 102 to the control unit 101, which then performs biometrics authentication for the biometrics information (step S307). This authentication may be password authentication or ID card authentication.

The control unit 101 determines whether or not the fingerprint is that of the user, which is preregistered to the system, on the basis of a result of the biometrics authentication process of step S307 (step S308).

If the control unit 101 determines that the fingerprint is not that of the user, it repeats the biometrics authentication process (steps S308 to S307).

If the control unit 101 determines that the fingerprint is that of the user, it starts to execute the second program 106 in the normal mode upon completion of logon (steps S308 to S309), and completes the startup process of the system.

Figure 4:
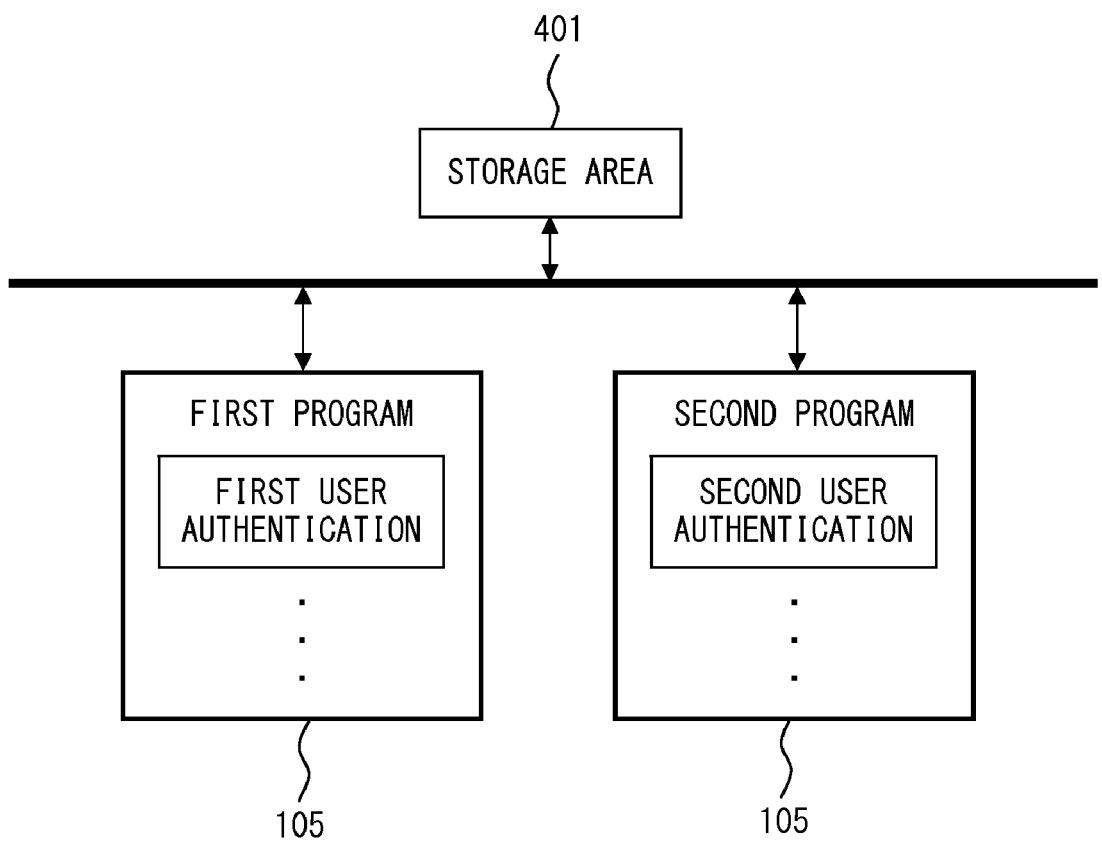
FIG. 4 is an explanatory view of the details of a process executed in forgery detection mode.

In the meantime, if the control unit 101 determines that the fingerprint is the forged one on the basis of the result of the biometrics authentication process of step S302 in the above described user authentication process, it invokes forgery detection mode that is a special mode, and executes the following control process in steps S310 to S312. This process is described with reference to the explanatory view of operations illustrated in FIG. 4.

Initially, the control unit 101 executes the first program 105 in the forgery detection mode (step S310). At this time, the forgery detection information is stored, for example, in a storage area 401 that is provided in the memory 202 of FIG. 2 and illustrated in FIG. 4.

Next, the control unit 101 invokes the second program 106 in the forgery detection mode (step S311). When the second program 106 is invoked in the forgery detection mode, a user cannot perform any operations, and the forgery detection information is obtained by referencing the storage area 401 under the environment of the second program 106.

After invoking the second program 106 in the forgery detection mode, the control unit 101 accesses the network 107 by using the network connection function possessed by the second program 106, and notifies the server 108 of the forgery detection information (step S312).

Thereafter, the control unit 101 terminates the execution of the second program 106, and then terminates the execution of the first program 105.

Here, the storage area 401 may be secured in the external storage device 205 of FIG. 2, or the like. Data of the forgery detection information is stored within the client 101, for example, if the amount of data to be obtained as the forgery detection information is too large and the entire amount of data cannot be transmitted to the server 108 as the forgery detection information, or if the network 107 is temporarily unavailable, whereby the forgery detection information can be analyzed in further detail later.

The invocation mode of the second program 106 may be common to the normal mode and the forgery detection mode. In this case, the forgery detection information is notified to the server 108 if it is stored in the storage area 401. If the forgery detection information is not stored, second authentication may be performed in the normal mode.

FIG. 5 is an example data structure of the forgery detection information notified from the client 101 to the server 108.

As illustrated in this figure, the forgery detection information includes, for example, a forgery detection result 501, a fingerprint matching result 502, forgery detection data 503, fingerprint matching data 504, etc.

The forgery detection data 503 is data used to determine forgery. For example, if forgery is determined based on impedance, the impedance of an input finger is recorded.

The fingerprint matching data 504 is data used for fingerprint matching, or input fingerprint image data.

The forgery detection data 503, the fingerprint matching data 504, etc. are notified to the server 108, whereby an illegal access can be analyzed in further detail.

It is desirable to encrypt and transmit the forgery detection information illustrated in FIG. 5.

FIG. 6 is an operational flowchart illustrating an example control process executed by the server 108 that is illustrated in FIG. 1 and receives the forgery detection information.

Initially, the server 108 obtains the forgery detection information (step S601).

Next, the server 108 records the forgery detection information (step S602).

Then, the server 108 notifies an administrator by e-mail, etc. that the forgery is detected (step S603).

As described above, in the first embodiment, if forgery is detected in the first user authentication (steps S302 to S304 of FIG. 3), the first program 105 and the second program 106 are executed in the forgery detection mode, the operation is locked, and the forgery detection information is notified to a preregistered device on the network 107, such as the server 108, etc. As a result, the forgery can be quickly detected.

The second embodiment is described next.

Figure 7:
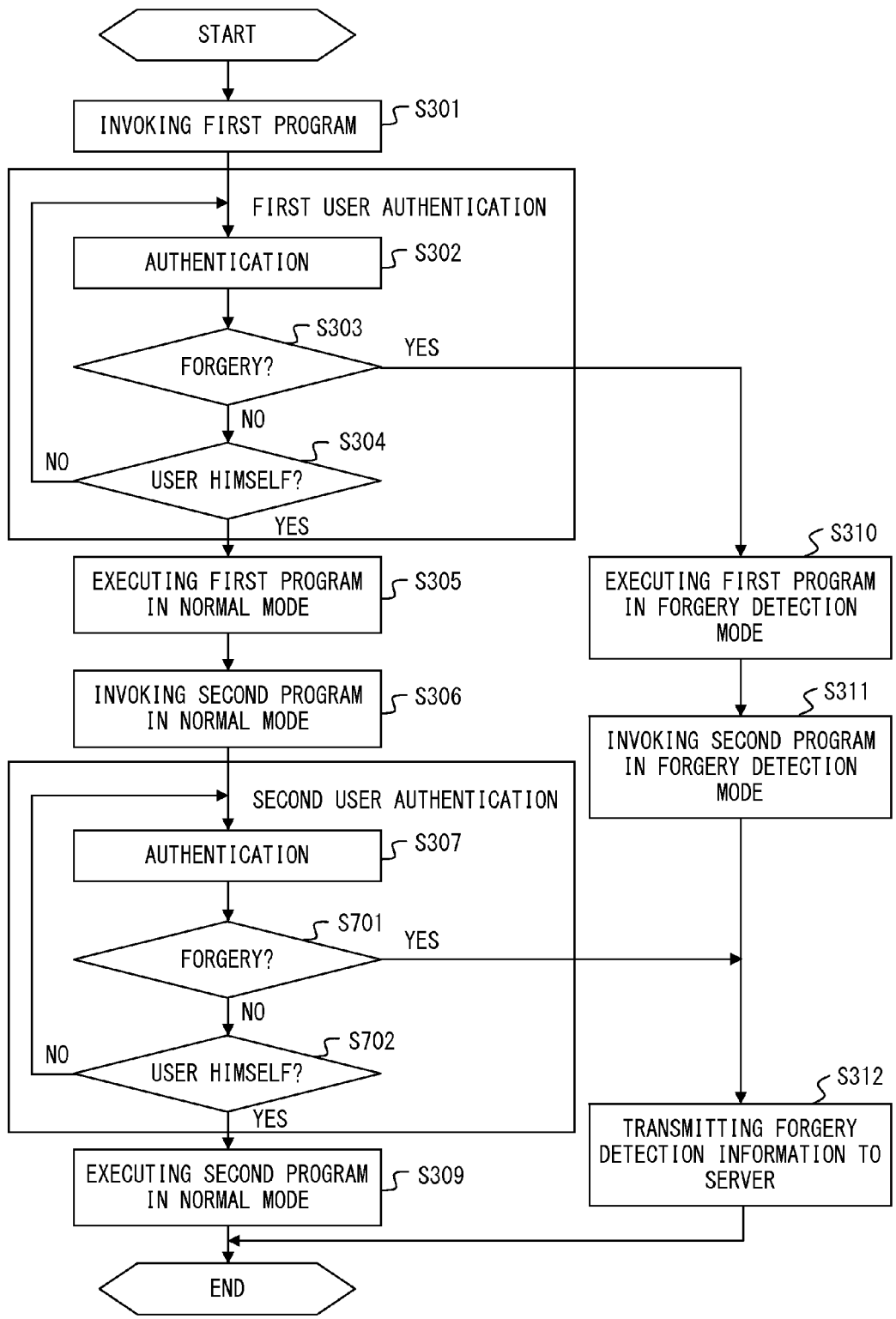
FIG. 7 is an operational flowchart illustrating a control process in the second embodiment of the biometrics authentication process in the system configuration illustrated in FIGS. 1 and 2.

FIG. 7 is an operational flowchart illustrating a control process in the second embodiment of the biometrics authentication process in the system configuration illustrated in FIGS. 1 and 2. This process is implemented as a function of the control unit 101 illustrated in FIG. 1.

In portions assigned with the same step numbers as those of the operational flowchart in the first embodiment illustrated in FIG. 3 in the operational flowchart illustrated in FIG. 7, the same control process as that of FIG. 3 is executed.

The control process of the operational flowchart illustrated in FIG. 7 is different from that of the operational flowchart in the first embodiment illustrated in FIG. 3 in the following control process of the second user authentication process.

Namely, fingerprint information is initially input from the biometrics information input unit 102 to the control unit 101, which then performs biometrics authentication for the fingerprint information (step S307).

Next, the control unit 101 determines whether or not the fingerprint is a forged one on the basis of the biometrics authentication process of step S307 (step S701).

If the control unit 101 determines that the fingerprint is not the forged one, it further determines whether or not the fingerprint is that of the user, which is preregistered to the system (steps S701 to S702).

If the control unit 101 determines that the fingerprint is not that of the user, it repeats the biometrics authentication process (steps S702 to S307).

If the control unit 101 determines that the fingerprint is that of the user, it starts to execute the second program 106 in the normal mode (steps S702 to S309), and completes the startup of the system.

Alternatively, if the control unit 101 determines that the fingerprint is the forged one on the basis of the result of the biometrics authentication process of step S307, it does not start to execute the second program 106, accesses the network 107 with the network connection function possessed by the second program 106, and notifies the server 108 of the forgery detection information (step S312).

Thereafter, the control unit 101 terminates the execution of the second program 106, and then terminates the execution of the first program 105.

As described above, in the second embodiment, the forgery detection information can be notified to the server even if forgery is detected in the second user authentication process.

The third embodiment is described next.

If it is desired to forcibly cause a user to stop operations after the forgery detection information is notified to the server 108, a control can be performed to terminate the second program 106 and the first program 105 as referred to in the first and the second embodiments. In this case, however, the user can possibly notice that illegal authentication has been detected. Accordingly, in the third embodiment, after the forgery detection information is notified (or while it is being notified) to the server 108, an authentication screen disguised as a regular second user authentication process screen is displayed as if authentication was successfully performed, and the system again requests user authentication (third user authentication) regardless of the result of the user authentication.

Figure 8:
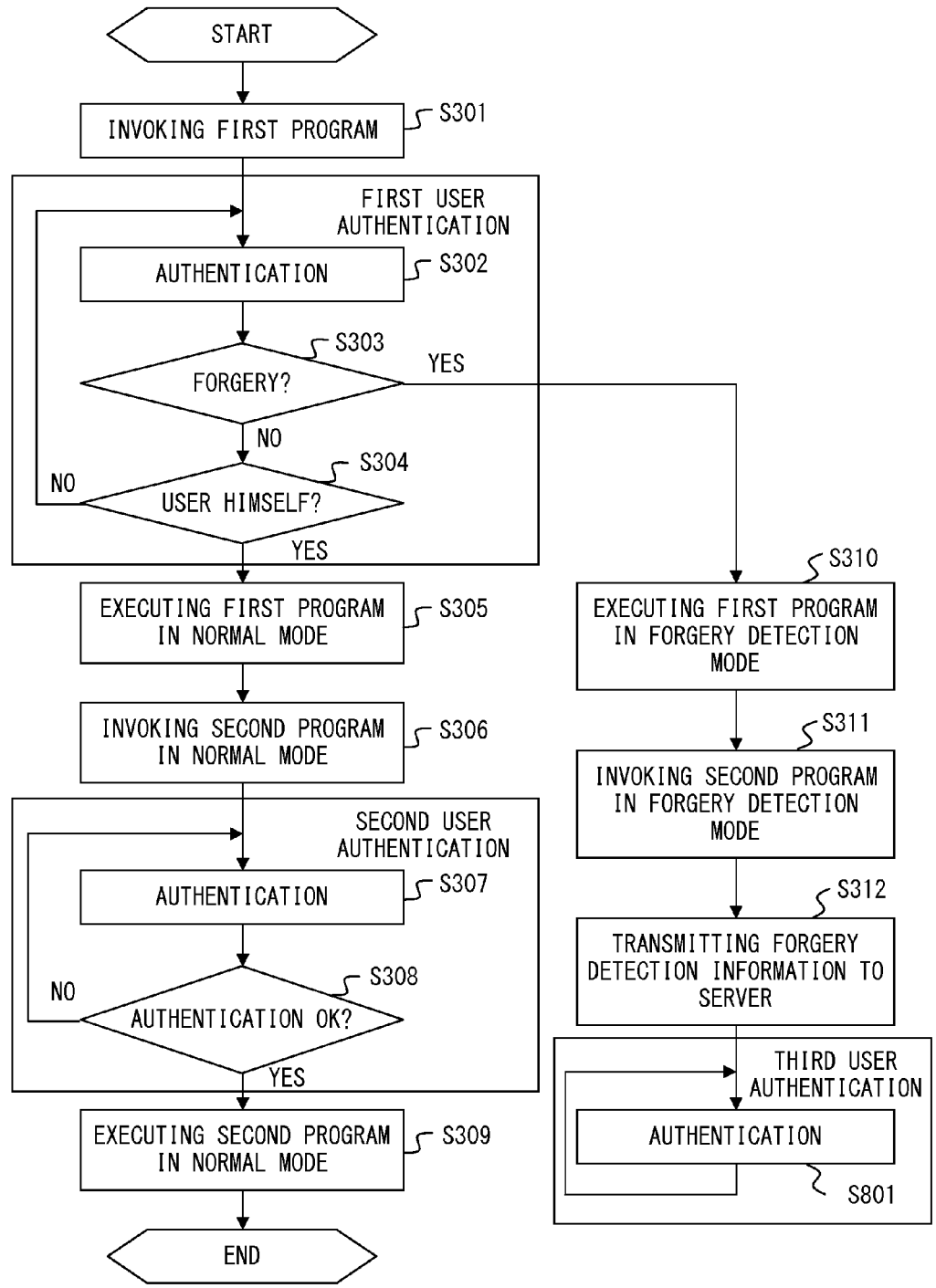
FIG. 8 is an operational flowchart illustrating a control process in the third embodiment of the biometrics authentication process in the system configuration illustrated in FIGS. 1 and 2.

FIG. 8 is an operational flowchart illustrating a control process in the third embodiment of the biometrics authentication process in the system configuration illustrated in FIGS. 1 and 2. This process is implemented as a function of the control unit 101 illustrated in FIG. 1.

In portions assigned with the same step numbers as those of the operational flowchart in the first embodiment illustrated in FIG. 3 in the operational flowchart illustrated in FIG. 8, the same control process as that of FIG. 3 is executed.

The control process of the operational flowchart illustrated in FIG. 8 is different from that of the operational flowchart in the first embodiment illustrated in FIG. 3 in the point that the disguised third user authentication screen is displayed under the control of the second program 106 (step S801) after the second program 106 is invoked in the forgery detection mode in step S311, and the forgery detection information is notified to the server 108 in step S312.

The third user authentication screen may be any of a biometrics authentication screen, a password authentication screen, and an ID card authentication screen.

In this step, the authentication screen is continuously displayed whatever operation a user performs.

The fourth embodiment is described next.

In the fourth embodiment, in a similar manner as in the third embodiment, an authentication screen disguised as a regular second user authentication process screen is displayed after the forgery detection information is notified (or while it is being notified) to the server 108, authentication (a fourth user authentication process) is actually performed, and a user is caused to log in to a special account accessible to only illegal user data that is not regular data.

Figure 9:
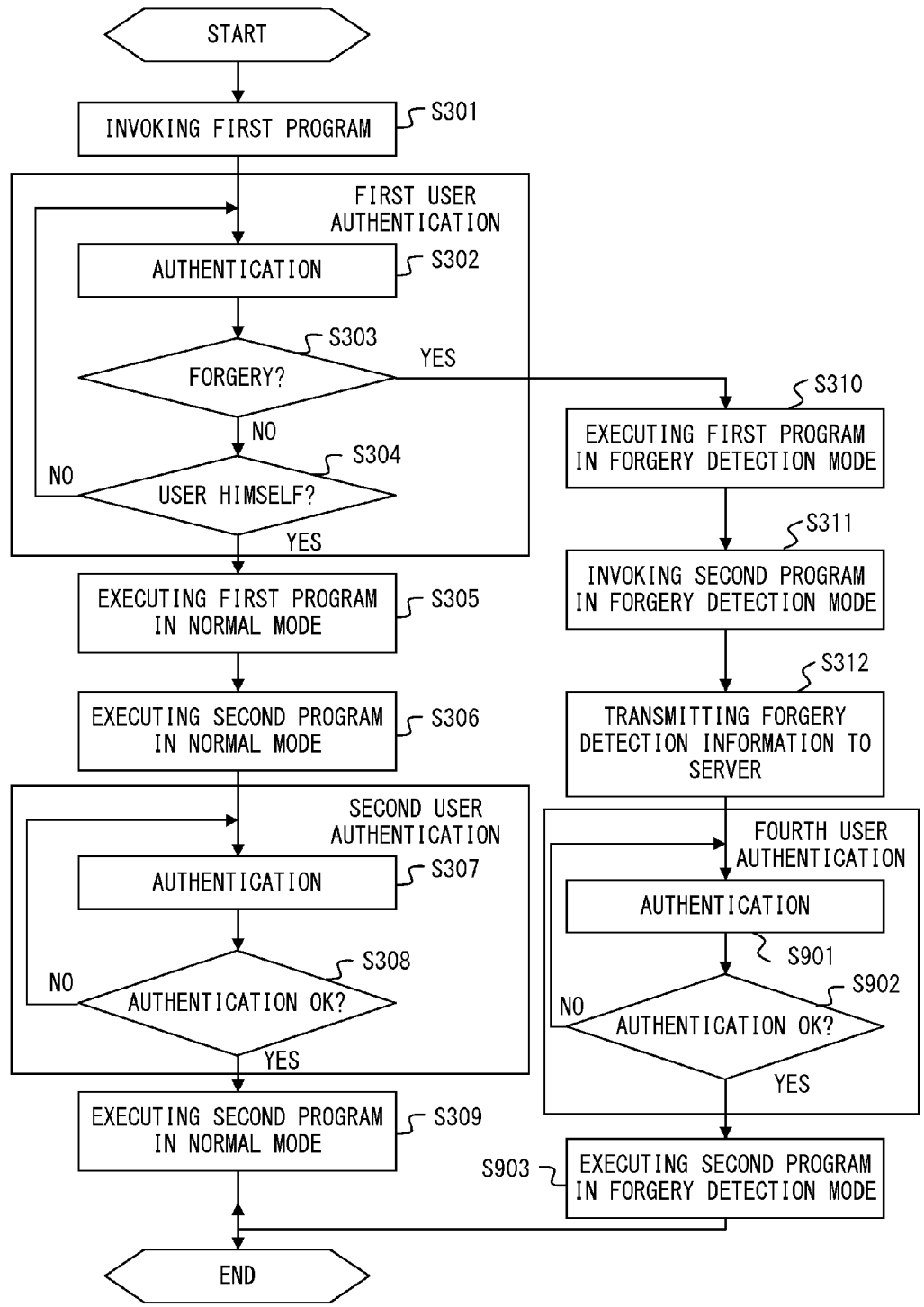
FIG. 9 is an operational flowchart illustrating a control process in the fourth embodiment of the biometrics authentication process in the system configuration illustrated in FIGS. 1 and 2.

FIG. 9 is an operational flowchart illustrating a control process in the fourth embodiment of the biometrics authentication process in the system configuration illustrated in FIGS. 1 and 2. This process is implemented as a function of the control unit 101 illustrated in FIG. 1.

In portions denoted with the same step numbers as those of the operational flowchart in the first embodiment illustrated in FIG. 3 in the operational flowchart of FIG. 9, the same control process as that of FIG. 3 is executed.

The control process of the operational flowchart illustrated in FIG. 9 is different from that of the operational flowchart in the first embodiment illustrated in FIG. 3 in the point that the disguised fourth user authentication screen is displayed under the control of the second program 106 (step S901), and authentication is performed (step S902) after the second program 106 is invoked in the forgery detection mode in step S311, and the forgery detection information is notified to the server 108 in step S312.

At this time, an authentication method by which user authentication is recognized to be successfully performed regardless of the result of the fourth user authentication process, or a method for causing a user to log in to the special account only if the user is determined as a legal user is considered. Moreover, it becomes possible to analyze the object of an illegal user by recording the actions of the user after he or she logs in to the special account.

The fourth user authentication screen may be any of a biometrics authentication screen, a password authentication screen, and an ID card authentication screen.

The fifth embodiment is described next.

Even in a regular authentication process, such as authentication for changing the settings of BIOS, which executes only the first program 105 and does not invoke the second program 106 such as an OS, etc. thereafter, the second program 106 is forcibly invoked to notify forgery detection information to the server 108 if forgery is detected. The fifth embodiment implements its control process.

Figure 10:
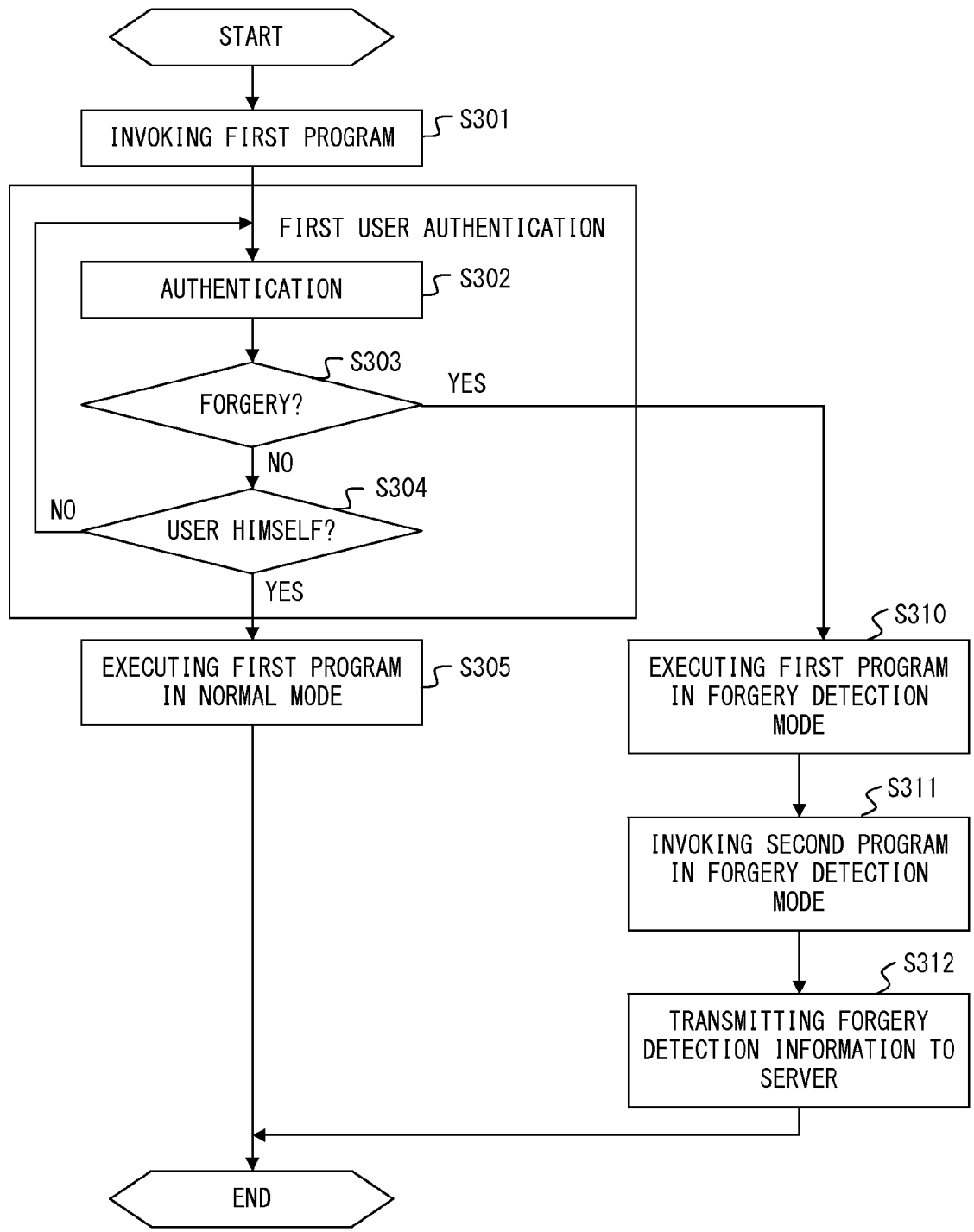
FIG. 10 is an operational flowchart illustrating a control process in the fifth embodiment of the biometrics authentication process in the system configuration illustrated in FIGS. 1 and 2.

FIG. 10 is an operational flowchart illustrating the control process in the fifth embodiment of the biometrics authentication process in the system configuration illustrated in FIGS. 1 and 2. This process is implemented as a function of the control unit 101 illustrated in FIG. 1.

In portions assigned with the same step numbers as those of the operational flowchart in the first embodiment illustrated in FIG. 3 in the operational flowchart illustrated in FIG. 10, the same control process as that of FIG. 3 is executed.

The control process of the operational flowchart illustrated in FIG. 10 is different from that of the operational flowchart in the first embodiment illustrated in FIG. 3 as follows.

Initially, only an authentication function to change the settings of BIOS is provided in the fifth embodiment. Therefore, the control unit 101 does not execute the functions of steps S306 to S309 of FIG. 3.

Additionally, if forgery is detected, the control unit 101 forcibly invokes the second program 106 in the forgery detection mode in step S311 after executing the first program 105 in the forgery detection mode in step S310, accesses the network 107 by using the network connection function possessed by the second program 106 and notifies the server 108 of the forgery detection information in step S312.

Thereafter, the control unit 101 terminates the execution of the second program 106, and then terminates the execution of the first program 105.

The sixth embodiment is described next.

The present invention is applicable to not only forgery detection by biometrics authentication but also illegal ID card detection, etc.

FIG. 11 is an operational flowchart illustrating a control process in the sixth embodiment of the biometrics authentication process in the system configuration illustrated in FIGS. 1 and 2. This process is implemented as a function of the control unit 101 illustrated in FIG. 1.

In portions assigned with the same step numbers as those of the operational flowchart in the first embodiment illustrated in FIG. 3 in the operational flowchart illustrated in FIG. 11, the same control process as that of FIG. 3 is executed.

The control process of the operational flowchart illustrated in FIG. 11 is different from that of the operational flowchart in the first embodiment illustrated in FIG. 3 in the point that the authentication process of step S302 and the determination process of step S303 are not for biometrics authentication but for card ID authentication, and the execution of the first program 105 in step S1101 and the invocation of the second program 106 in step S1102 are made in illegal card detection mode if an illegal card is detected in step S302.

Examples of an illegal ID card include an ID card having a nonexistent ID, an unavailable ID card, and the like.

As alternate embodiments other than the above described first to sixth embodiments, for example, the program invoked after the first program 105 is executed in the forgery detection mode may be a program different from the second program 106 invoked in the normal mode, such as a program created to notify the forgery detection information. The program created to notify the forgery detection information can, for example, significantly reduce a startup time.

Additionally, the second program 106 may be a program that does not require user authentication when being executed.

Furthermore, the second program 106 may be invoked to notify the server 108 of the forgery detection information only if forgery is detected by a predetermined number of times or more.

In the first implementation example, if biometrics authentication with forgery is detected at the time of the first user authentication, a step of executing the first program in the forgery detection mode is executed regardless of the result of the user determination.

Next, after the first program is executed in the forgery detection mode, a step of invoking the second program in the forgery detection mode is executed.

Then, after the second program is invoked in the forgery detection mode, a step of notifying the device connected to the external network of the forgery detection information by using the network connection function is executed.

The above described configuration in the first implementation example can be configured to further include the following steps.

Initially, if user authentication is successfully performed without detecting biometrics authentication with forgery at the time of the first user authentication, a step of executing the first program in the normal mode is executed.

Next, after the first program is executed in the normal mode, a step of invoking the second program in the normal mode is executed.

Then, after the second program is invoked in the normal mode, a step of performing the second user authentication is executed.

Then, if the user is determined as a legal user at the time of the second user authentication, a step of executing the second program in the normal mode is executed.

Here, if authentication with forgery is detected at the time of the second user authentication, a step of notifying the device connected to the external network of the forgery detection information by using the network connection function can be further included regardless of the result of the user determination.

The configuration in the first implementation example described up to this point can further include a step of again requesting the first user authentication, if the user is unsuccessfully determined without detecting authentication with forgery at the time of the first user authentication.

The configuration in the first implementation example described up to this point can further include a step of terminating the second program after the forgery detection information is notified. Also a step of terminating the first program after the second program is terminated can be further included.

Alternatively, the configuration in the first implementation example can further include, simultaneously with a notification of the forgery detection information, a step of performing the third user authentication for again requesting user authentication regardless of the result of the user authentication.

Alternatively, the configuration in the first implementation example can further include, simultaneously with a notification of the forgery detection information, a step of performing fourth user authentication and a step of executing the second program in the forgery detection mode where the user can access only illegal user data after the fourth user authentication is performed. In this case, a control can be performed so that the user authentication is successfully performed regardless of the result of the user authentication. Alternatively, a control can be performed so that the user authentication is successfully performed only if the user is determined as a legal user with the second user authentication.

Alternatively, the configuration in the first implementation example can further include, simultaneously with the notification of the forgery detection information, a step of executing the second program in the forgery detection mode where the user can access only illegal user data. At this time, a control for recording the actions of the user can be performed.

The above described first implementation example can be configured so that the second user authentication, the third user authentication, or the fourth user authentication is biometrics authentication, password authentication or card authentication.

The above described first implementation example can be configured so that the first program is a basic input output system (BIOS system).

Additionally, the above described first implementation example can be configured so that the second program is an operating system.

Furthermore, the above described first implementation example can be configured so that the forgery detection information includes an authentication result, and data used to determine authentication.

Still further, the above described first implementation example can further include a step of storing the forgery detection information within a local device after the second program is invoked in the forgery detection mode.

The above described first implementation example can be also configured to execute a step of executing the first program in the forgery detection mode if biometrics authentication with forgery is detected by a predetermined number of times or more at the time of the first user authentication.

In a second implementation example, if biometrics authentication with forgery is detected at the time of the first user authentication, a step of executing the first program in the forgery detection mode is initially executed regardless of the result of the user authentication.

Next, after the first program is executed in the forgery detection mode, a step of executing a third program having at least a network connection function is executed.

Then, after the third program is invoked, a step of notifying a device connected to an external network of the forgery detection information by using the network connection function is executed.

In a third implementation example, the user authentication process is not executed at the invocation of the second program.

In a fourth implementation example, if card authentication with an illegal card is detected at the time of the first user authentication, a step of executing the first program in the illegal card detection mode is initially executed regardless of the result of the user authentication.

Next, after the first program is executed in the illegal card detection mode, a step of invoking the second program in the illegal card detection mode is executed.

Then, after the second program is invoked in the forgery detection mode, a step of notifying the device connected to the external network of the illegal card detection information by using the network connection function is executed.

As described above, with the aforementioned authentication method, apparatus or program, if forgery or illegal authentication with a forged finger, an illegal card, etc. is detected, the second program is executed in special mode (forgery or illegal detection mode), and forgery detection information is immediately notified to a server, whereby authentication with forgery in BIOS, etc. can be instantaneously detected.

As a result, forgery at the time of biometrics authentication performed by a program that does not have a network connection function can be quickly detected and coped with, which is conventionally difficult.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An authentication method for use in an apparatus including a function to detect biometrics authentication with forgery, a function to execute a BIOS (Basic Input/Output System) which executes a predetermined boot process and does not include a network connection function, after first user authentication with biometrics authentication is performed, and a function to execute an OS (Operating System) after the BIOS is executed, executed after second user authentication and includes a network connection function, the method comprising:
   executing the BIOS in forgery detection mode when biometrics authentication with forgery is detected at a time of the first user authentication;
   executing the OS in the forgery detection mode after the BIOS is executed in the forgery detection mode; and
   notifying a device connected to an external network of forgery detection information by using the network connection function after the OS is executed in the forgery detection mode.

2. The authentication method according to claim 1, further comprising:
   executing the BIOS in normal mode when a user determination is successfully made without detecting biometrics authentication with forgery at a time of the first user authentication;
   invoking the OS in a normal mode after the BIOS is executed in the normal mode;
   performing the second user authentication after the OS is invoked in the normal mode; and
   executing the OS in the normal mode when a user is determined as a legal user in the second user authentication.

3. The authentication method according to claim 2, further comprising
   notifying the device connected to the external network of the forgery detection information by using the network connection function regardless of a result of the user determination, when authentication with forgery is detected at a time of the second user authentication.

4. The authentication method according to claim 1, further comprising
   again requesting the first user authentication when the user determination is unsuccessfully made without detecting authentication with forgery at a time of the first user authentication.

5. The authentication method according to claim 1, further comprising
   terminating the OS after the forgery detection information is notified.

6. The authentication method according to claim 5, further comprising
   terminating the BIOS after the OS is terminated.

7. The authentication method according to claim 1, further comprising
   performing third user authentication for again requesting user authentication regardless of a result of the second user authentication simultaneously with a notification of the forgery detection information.

8. The authentication method according to claim 1, further comprising:
   performing fourth user authentication simultaneously with a notification of the forgery detection information; and
   executing the OS in the forgery detection mode where a user can access only illegal user data, after the fourth user authentication is performed.

9. The authentication method according to claim 8, wherein
   a control is performed so that the user authentication is successfully performed regardless of a result of the fourth user authentication in the performing the fourth user authentication.

10. The authentication method according to claim 8, wherein
    a control is performed so that the user authentication is successfully performed only when the user is determined as a legal user as a result of the fourth user authentication in the performing the fourth user authentication.

11. The authentication method according to claim 1, further comprising
    executing the OS in the forgery detection mode where a user can access only illegal user data simultaneously with a notification of the forgery detection information.

12. The authentication method according to claim 11, wherein
    a control for recording actions of the user is performed in the executing the OS in the forgery detection mode.

13. The authentication method according to claim 1, wherein
    the second user authentication, is biometrics authentication, password authentication, or card authentication.

14. The authentication method according to claim 1, wherein
    the forgery detection information includes an authentication result, and data used to determine authentication.

15. The authentication method according to claim 1, further comprising
    storing the forgery detection information within a local device after the OS is invoked in the forgery detection mode.

16. The authentication method according to claim 1, wherein
executing the BIOS in the forgery detection mode is executed when biometrics authentication with forgery is detected by a predetermined number of times or more at the time of the first user authentication.

17. An authentication method for use in an apparatus including a function to detect biometrics authentication with forgery, a function to execute a BIOS (Basic Input/Output System) which executes a predetermined boot process and does not include a network connection function, after first user authentication with biometrics authentication is performed, and a function to execute an OS (Operating System) after the BIOS is executed, executed after second user authentication and includes a network connection function, the method comprising:
 executing the BIOS in forgery detection mode when biometrics authentication with forgery is detected at a time of the first user authentication;
 invoking a third program that includes at least a network connection function after the BIOS is executed in the forgery detection mode; and
 notifying a device connected to an external network of forgery detection information by using the network connection function of the third program after the third program is invoked.

18. An authentication method for use in an apparatus including a function to detect biometrics authentication with forgery, a function to execute a BIOS (Basic Input/Output System) which executes a predetermined boot process and does not include a network connection function, after first user authentication with biometrics authentication is performed, and a function to execute an OS (Operating System) invoked after the BIOS is executed and includes a network connection function, the method comprising:
 executing the BIOS in forgery detection mode when biometrics authentication with forgery is detected at a time of the first user authentication;
 invoking the OS in the forgery detection mode after the BIOS is executed in the forgery detection mode; and
 notifying a device connected to an external network of forgery detection information by using the network connection function after the OS is invoked in the forgery detection mode.

19. A computer-readable non-transitory medium storing a program that causes a computer to execute a procedure, the computer including a function to detect biometrics authentication with forgery, a function to execute a BIOS (Basic Input/Output System) which executes a predetermined boot process and does not include a network connection function, after first user authentication with biometrics authentication is performed, and a function to execute an OS (Operating System) after the BIOS is executed, executed after second user authentication and includes a network connection function, the procedure comprising:
 executing the BIOS in forgery detection mode when biometrics authentication with forgery is detected at a time of the first user authentication;
 executing the OS in the forgery detection mode after the BIOS is executed in the forgery detection mode; and
 notifying a device connected to an external network of forgery detection information by using the network connection function after the OS is invoked in the forgery detection mode.

20. An authentication apparatus including a function to detect biometrics authentication with forgery, a function to execute a BIOS (Basic Input/Output System) which executes a predetermined boot process and does not include a network connection function, after first user authentication with biometrics authentication is performed, and a function to execute an OS (Operating System) after the BIOS is executed, executed after second user authentication and includes a network connection function, the authentication apparatus comprising:
 a unit to execute the BIOS in forgery detection mode when biometrics authentication with forgery is detected at a time of the first user authentication;
 a unit to invoke the OS in the forgery detection mode after the BIOS is executed in the forgery detection mode; and
 a unit to notify a device connected to an external network of forgery detection information by using the network connection function after the OS is invoked in the forgery detection mode.

21. The authentication method according to claim 7, wherein the second user authentication or the third user authentication is biometrics authentication, password authentication, or card authentication.

22. The authentication method according to claim 8, wherein the second user authentication or the fourth user authentication is biometrics authentication, password authentication, or card authentication.

* * * * *